Patented Aug. 1, 1950

2,517,096

UNITED STATES PATENT OFFICE 2,517,096

MANUFACTURE OF CELLULOSE ESTERS

Charles Doras, Dijon, France, assignor to Societe Rhodiaceta, Paris, France, a French company No Drawing. Application March 8, 1950, Serial No. 148,519. In France February 8, 1946

11 Claims. (Cl. 260—225)

The present invention relates to the manufacture of cellulose esters by processes in which the esterified cellulose is soluble in the esterification mixture, and it has particular relation to the manufacture of cellulose esters of lower aliphatic acids containing not more than 4 carbon atoms in the molecule, in the presence of esterification catalysts other than sulfuric acid.

In the previously known esterification processes of the above mentioned type, the cellulose ester produced dissolves in the esterification mixture and remains in this solution until the end of the esterification so that the first portions of the ester to be formed remain subjected to the action of the reagents until the whole of the cellulose has become esterified and dissolved. As a consequence of this, the first and major part of the cellulose ester formed undergoes a degradation which is harmful to the quality of the products prepared from such esters.

According to the present invention cellulose is esterified by means of an esterification bath capable of dissolving the cellulose derivative formed, but, in contrast to the before-mentioned known processes, as the cellulose derivative is formed and goes into solution, this solution is separated from the rest of the reaction mass and subjected to a treatment which prevents appreciable degradation of the cellulose derivative already formed, whereas in the non-completely esterified and undissolved residue the reaction continues until esterification and solubilization of the whole of the cellulose takes place.

In order to stop the reaction in the solution of the esterified product and to prevent the before-mentioned degradation of the ester, any known method can be used, such as for example destruction of the excess of the esterifying reagent or destruction of the reaction catalyst.

In carrying out the process of my invention, esterification catalysts other than sulfuric acid, such as nitric acids, hydrochloric acid, hydrobromic acid, perchloric acid, sulfonic acids, zinc chloride, etc., mixtures of these substances with each other or with sulfuric acid, are used as catalysts.

In carrying out the process of the present invention, the esterifying bath can be brought in contact with the cellulose in any suitable apparatus, for example an apparatus containing a filtering device, through which the solution of the cellulose ester formed can be passed, in which, however, those cellulosic fibres which have not been completely esterified yet, are retained. These fibres are swollen and impregnated by the esterification mixture and remain, therefore, exposed to reaction of the esterifying agents so that their esterification continues. As soon as the cellulose ester is formed, it passes into solution and this solution then emerges from the filtering device and is treated to stop further reaction in the solution. Meanwhile the reaction in the residue goes on until all the cellulose which has been introduced into the reaction mixture is esterified and goes into solution as esterification proceeds.

The apparatus of the above mentioned type used for the separation of cellulose ester solution from the undissolved, not completely esterified cellulosic material may, for example, consist of a system of wire gauze or filters consisting of textile materials resistant to the esterification bath, layers of sand, metallic turnings or Raschig rings or the like.

The invention may be applied to continuous esterification processes and also to discontinuous operation.

The following examples illustrate the methods of the invention by way of example without limiting it in any respect. The parts are by weight unless otherwise stated.

Example 1

A continuously prepared mixture containing 100 parts of cellulose pretreated in customary manner with 30 parts of acetic acid of 100%,
500 parts of acetic acid of 100%,
250 parts of acetic anhydride, and
150 parts of anhydrous zinc chloride are supplied continuously to an apparatus of the type described in U. S. Patent No. 1,859,579. The fibrous mass emerging from said apparatus is supplied by means of a piston pump to a column containing stacks of wire gauze of increasingly fine mesh, the first portions having a mesh of 2 to the square cm. and the last portions of 10,000 to 12,000 per square cm. The temperature of this column is maintained at 80° C.

The cellulose triacetate solution emerging from the column is mixed immediately with ⅓ of its weight of acetic acid of 60% in order to destroy the excess of acetic anhydride. The solution thus obtained is now precipitated by the addition of water.

In the above described manner a completely stable cellulose triacetate is obtained, the solutions of which in methylene chloride are extremely limpid and which yields films of very high quality.

Instead of immediate precipitation, the solution of cellulose triacetate may be subjected to a ripening treatment. In this manner an acetone-soluble cellulose acetate of excellent properties is obtained.

Example 2

100 parts of cellulose are pretreated at ordinary room temperature of 18° to 20° C. with a mixture consisting of 250 parts of acetic acid of 100%,
250 parts of butyric acid,
2 parts of concentrated sulfuric acid.

The cellulose thus pretreated is continuously introduced into an apparatus similar to that used in Example 1 and continuously fed with a mixture consisting of 350 parts of butyric acid,
250 parts of acetic anhydride, and
10 parts of perchloric acid.

The column containing the stack of metal gauzes is maintained at a temperature of 40° C. The solution emerging from the column is mixed with acetic acid of 60% in order to avoid degradation of the mixed ester formed.

By precipitation, cellulose aceto-butyrate of excellent quality is obtained.

Example 3

The same apparatus as in Example 1 is used in this case.

100 parts of cellulose are pretreated at a temperature of 25° C. for 2½ hours with a mixture consisting of 100 parts of acetic acid of 100%,
50 parts of acetic anhydride,
0.5 part of perchloric acid of 65%.

The cellulose thus pretreated is continuously supplied to an apparatus which is likewise continuously fed with the following two mixtures:

Mixture (A):
200 parts of acetic acid of 100%,
180 parts of acetic anhydride.

This mixture has a temperature of 15° C.

Mixture (B):
100 parts of acetic acid 100%,
20 parts of perchloric acid of 65%

This mixture has a temperature of 18° C.

The column provided with the filtering system is kept at a temperature of 45° C.

The solution emerging from the column is mixed with acetic acid of 60% in order to destroy the excess of acetic anhydride; the solution is subjected to hydrolysis until an acetone-soluble cellulose acetate is formed.

Example 4

100 parts of cellulose are continuously mixed with an acetylating bath prepared by mixing 500 parts of glacial acetic acid with 300 parts of acetic anhydride and 2 parts of magnesium perchlorate trihydrate or ammonium perchlorate.

Esterification in the reaction mass thus formed is carried out at 60°–65° C. substantially in the manner described in the above Example 1.

Example 5

100 parts of cellulose are continuously mixed with an esterifying bath prepared by mixing 750 parts of propionic acid, 750 parts of propionic anhydride and 25 parts of magnesium perchlorate trihydrate.

Esterification in the reaction mass thus formed is carried out at 45°–50° C. substantially in the manner described in the above Example 1.

Example 6

100 parts cellulose are mixed with 350 parts acetic anhydride, 5 parts phenolsulfonic acid, and to the mixture 150 parts of glacial acetic acid are added.

Esterification is carried out at about 80° C. substantially in the manner described in the previous examples.

Example 7

150 parts cotton are stirred with 25 parts glacial acetic acid for four hours. The cotton thus treated is now continuously mixed with an acetylation bath consisting of 250 parts of acetic acid of 100%,
600 parts of acetic anhydride, and
140 parts of methane sulfonic acid.

Esterification is carried out at about 25° C. according to the procedure described in Example 1.

Example 8

100 parts of cotton are stirred with 25 parts of glacial acetic acid for 4 hours, and then continuously mixed with an esterifying bath consisting of 600 parts glacial acetic acid,
375 parts acetic anhydride, and
100 parts methane sulfonic acid containing 2% $H_2SO_4$.

During esterification the temperature of the reaction mixture is increased from 25° C. to 45° C. and the procedure corresponds in every respect to that described in Example 1.

As shown by the above examples, in all cases solution of completely esterified cellulose is separated from the reaction mixture, while esterification is continued in the residual reaction mixture until all cellulose is completely esterified and dissolved. The separated cellulose ester solution is subjected to precipitation, neutralization of the catalyst or the like, in order to prevent degradation of the cellulose ester and obtain cellulose esters of high quality.

It will be understood that this invention is not limited to the specific steps, substances and conditions described above and may be carried out with various modifications without departing from the scope of the invention as defined in the appended claims.

Reference is made to my co-pending application Ser. No. 725,234, filed on January 30, 1947, of which this is a continuation-in-part.

What is claimed is:

1. A method of producing a cellulose ester of lower aliphatic acids by mixing cellulose with an esterifying liquid comprising the anhydride of a lower aliphatic acid, a lower aliphatic acid and a catalyst selected from the group consisting of cellulose esterification catalysts other than sulfuric acid, said lower aliphatic acids containing not more than 4 carbon atoms in the molecule; removing during esterification from the reaction mixture containing incompletely esterified undissolved cellulose and dissolved cellulose ester, esterification of which is completed, solution of said cellulose ester; rendering the removed solution incapable of causing degradation of the cellulose ester dissolved therein and continuing esterification in the reaction mixture.

2. A method of producing cellulose acetate by mixing cellulose with an esterifying liquid consisting of acetic anhydride, acetic acid and zinc chloride catalyst; removing, during acetylation from the reaction mixture containing incompletely acetylated undissolved cellulose and dissolved cellulose acetate, acetylation of which is completed, solution of said cellulose acetate; rendering the removed solution incapable of causing degradation of the cellulose acetate dissolved therein, and continuing acetylation in the reaction mixture.

3. A method of producing cellulose acetate by mixing cellulose with an esterifying liquid consisting of acetic anhydride, acetic acid and perchloric acid catalyst; removing, during acetylation from the reaction mixture containing incompletely acetylated undissolved cellulose and dissolved cellulose acetate, acetylation of which is completed, solution of said cellulose acetate; rendering the removed solution incapable of causing degradation of the cellulose acetate dissolved therein, and continuing acetylation in the reaction mixture.

4. In a process for producing a cellulose ester of lower aliphatic acids according to the solution type process, the steps of continuously supplying a mixture of cellulose with an esterifying liquid comprising the anhydride of a lower aliphatic acid, a lower aliphatic acid and an esterification catalyst selected from the group consisting of cellulose esterification catalysts other than sulfuric acid, to a reaction mixture of cellulose and said esterifying liquid said lower aliphatic acids containing not more than 4 carbon atoms in the molecule; continuously removing from said reaction mixture containing incompletely esterified, undissolved cellulose and dissolved cellulose ester, esterification of which is completed, solution of said cellulose ester; rendering the removed solution incapable of causing degradation of the cellulose ester dissolved therein and continuing esterification in the reaction mixture.

5. In a process for producing cellulose acetate according to the solution type process, the steps of continuously supplying a mixture of cellulose with an esterifying liquid consisting of acetic anhydride, acetic acid and zinc chloride catalyst, to a reaction mixture of cellulose and said esterifying liquid, continuously removing from said reaction mixture containing incompletely acetylated, undissolved cellulose and dissolved cellulose acetate, acetylation of which is completed, solution of said cellulose acetate; rendering the removed solution incapable of causing degradation of the cellulose acetate dissolved therein and continuing esterification in the reaction mixture.

6. In a process for producing cellulose acetate according to the solution type process, the steps of continuously supplying a mixture of cellulose with an esterifying liquid consisting of acetic anhydride, acetic acid and perchloric acid catalyst, to a reaction mixture of cellulose and said esterifying liquid; continuously removing from said reaction mixture containing incompletely acetylated, undissolved cellulose and dissolved cellulose acetate, acetylation of which is completed, solution of said cellulose acetate; rendering the removed solution incapable of causing degradation of the cellulose acetate dissolved therein and continuing esterification in the reaction mixture.

7. A method of producing a mixed cellulose ester of lower aliphatic acids by mixing cellulose with an esterifying liquid consisting of an anhydride of a lower aliphatic acid, lower aliphatic acids and a catalyst selected from the group consisting of cellulose esterification catalysts other than sulfuric acid said lower aliphatic acids containing not more than 4 carbon atoms in the molecule; removing during esterification from the reaction mixture containing incompletely esterified undissolved cellulose and dissolved cellulose ester, esterification of which is completed, solution of said cellulose ester, rendering the removed solution incapable of causing degradation of the cellulose ester dissolved therein and continuing esterification in the reaction mixture.

8. A method as claimed in claim 1, in which removal of the cellulose ester solution is effected by filtration of the reaction mixture.

9. A method as claimed in claim 1, in which removal of the cellulose ester solution is effected by subjecting the reaction mixture to centrifuging.

10. A method as claimed in claim 1, in which the separated solution of the cellulose ester is treated with a precipitating agent for said ester immediately after separation.

11. A method as claimed in claim 1, in which the separated solution of the cellulose ester is subjected to a ripening treatment before precipitation.

CHARLES DORAS.

No references cited.